No. 727,989. PATENTED MAY 12, 1903.
H. A. MILLER.
SECTIONAL SHEET PILING AND MEANS FOR SINKING SAME.
APPLICATION FILED MAY 28, 1901.
NO MODEL. 2 SHEETS—SHEET 1.
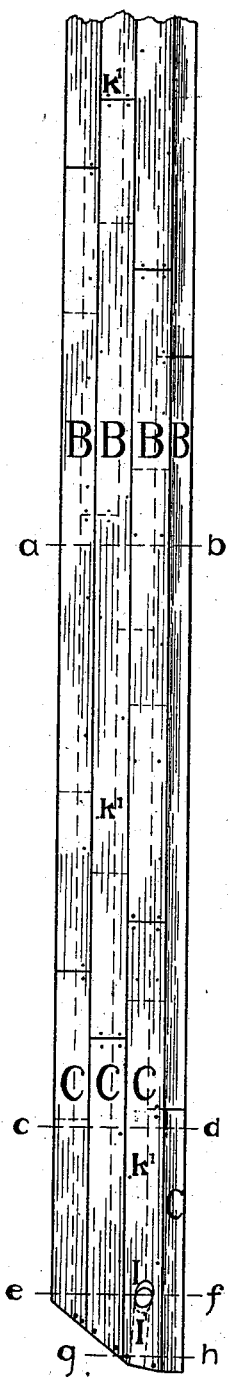
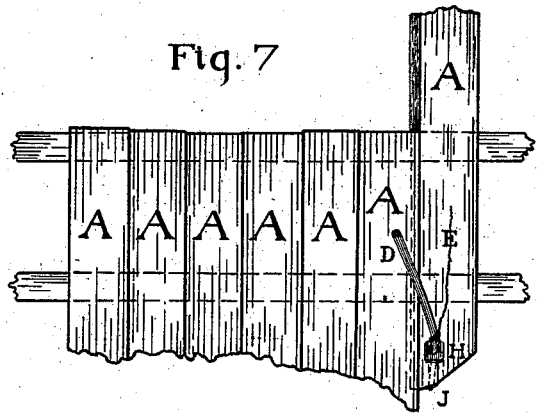
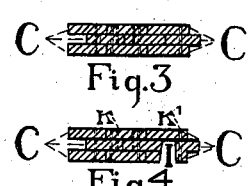
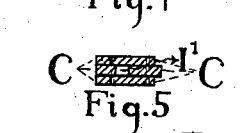
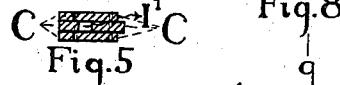

No. 727,989. PATENTED MAY 12, 1903.
H. A. MILLER.
SECTIONAL SHEET PILING AND MEANS FOR SINKING SAME.
APPLICATION FILED MAY 28, 1901.
NO MODEL. 2 SHEETS—SHEET 2.
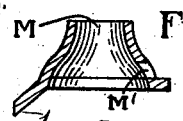
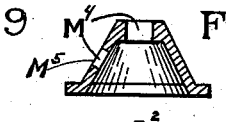
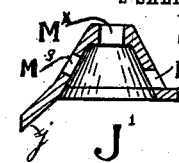
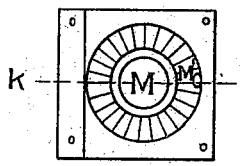
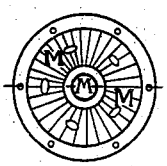
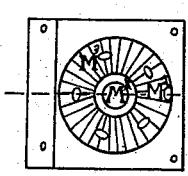
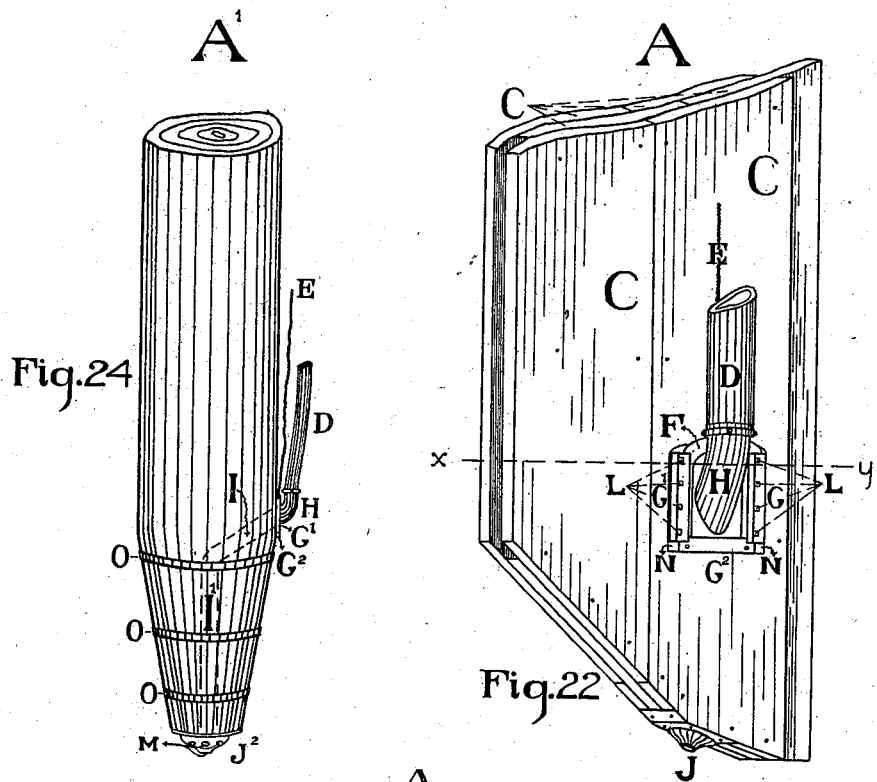
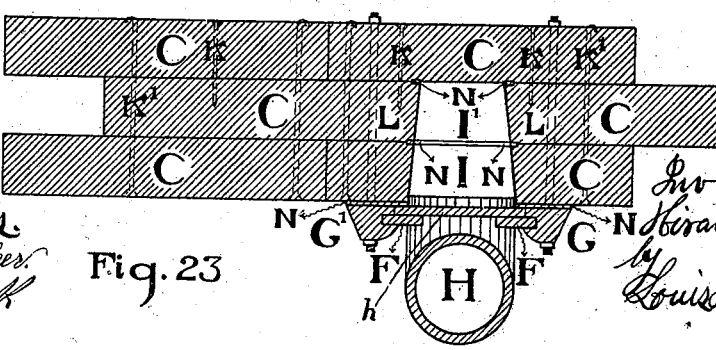

No. 727,989. Patented May 12, 1903.

UNITED STATES PATENT OFFICE.

HIRAM A. MILLER, OF CLINTON, MASSACHUSETTS.

SECTIONAL SHEET-PILING AND MEANS FOR SINKING SAME.

SPECIFICATION forming part of Letters Patent No. 727,989, dated May 12, 1903.

Application filed May 28, 1901. Serial No. 62,249. (No model.)

*To all whom it may concern:*

Be it known that I, HIRAM A. MILLER, a citizen of the United States, and a resident of Clinton, in the county of Worcester and State of Massachusetts, have invented certain new and useful Improvements in Sectional Sheet-Piling and Means for Sinking the Same, of which the following is a specification.

In the construction of dams, embankments, and other hydraulic engineering works it has often been found necessary or desirable to sink piles to such a depth that the work was rendered extremely difficult and expensive, and prior to my invention it has been considered practically impossible to construct a sheet-piling fifty to eighty feet in length and sink the same its entire length, although the instances where it is very desirable to do this are and have been numerous.

The objects of my invention are to produce a form of sheet-piling which may be made of any desired length, width, and thickness and is comparatively inexpensive and to provide in connection therewith a means for easily and rapidly sinking the piling to any desired depth. I accomplish this object by producing a form of piling which is made of a series of strips of lumber of various widths and lengths, each of which has dimensions much less than the piling of which it is a part and which are arranged so that they break joints at all points and are secured together by nails, end to end and side by side, in such a manner that the length of the piling may be increased indefinitely. I also form the sheet-piling so that each pile makes a tongue-and-groove joint with the next. I further provide the bottom of each pile with a nozzle to which a force-pump may be connected, so as to forcibly discharge water therethrough and wash away the earth below the pile, thus permitting the latter to sink into position with light driving, and I provide in connection therewith a coupling which may be readily detached from the nozzle, so that the hose-pipe which I employ to conduct the water thereto may be recovered.

For a more complete understanding of my invention reference is made to the accompanying drawings, forming a part of this specification, in which—

Figure 1 is a side elevation of a section of sheet-piling. Figs. 2, 3, 4, and 5 are cross-sections therethrough taken on the lines *a b*, *c d*, *e f*, and *g h*, respectively, of Fig. 1. Fig. 6 is a cross-section of a modified form of sheet-piling. Fig. 7 is a side elevation of the upper ends of a series of piles already driven and the lower end of a section about to be driven. Figs. 8 to 15, inclusive, are detail views of the hose connection, Fig. 9 being a cross-section on the line *o p* of Fig. 8. Figs. 16, 17, and 18 are detail plan views of three different forms of nozzles which I may employ; and Figs. 19, 20, and 21 are cross-sections on the lines *k l*, *r s*, and *m n*, respectively. Fig. 22 is a perspective view of the bottom portion of a piling with the fittings used in driving attached. Fig. 23 is an enlarged cross-section taken on the line *x y* of Fig. 22. Fig. 24 is an elevation of the lower end of an ordinary round pile with a portion of my invention attached.

The sheet-piling A is made of a series of planks B, of spruce or other inexpensive wood, and a series of planks C at its lower end, of oak or some other hard wood. The piling is made of three thicknesses of planks of any desired or convenient width or length, which are arranged side by side and end to end in such a manner that the joints between two planks in one thickness will not coincide with any of the joints in the next thickness. The middle thickness or layer is arranged with respect to the outside layers in such a position that a tongue is formed on one edge of the piling and a corresponding groove in the other, so that when the sections of flat piling are set edge to edge they will be jointed together by a tongue-and-groove joint. The various parts of the pile are secured by nails K, which secure the outer layers to the middle layer, and by clenched spikes K', which pass entirely through the piling. The bottom of the piles are cut off diagonally next their grooved side to cause them to move toward the previously-driven piles as they are driven.

Prior to my invention a sheet-piling has been produced which consists of three layers of board of equal length and thickness, having the middle plank so arranged that each piling will make a tongue-and-groove joint with the next. These pilings could be made, however, only in limited lengths and were, moreover, much more expensive to manufacture than those made according to my invention, for the reason that by making the piling out of odd pieces of lumber the cost is very materially reduced, and by arranging the pieces as above described the proportional cost of a long pile is no greater than for a short one. However, the principal advantage of a pile made according to my invention over the prior art is that it can be made of any desired length.

As a piling which is constructed as above described could not be driven by a pile-driver to any extent without its being broken in pieces, it therefore became necessary to use means in connection therewith which enabled the pile to be sunk with very light driving. In constructing each pile I therefore form an opening I in an outside plank C near the bottom of the pile and also leave or form a passage I', which leads from opening I to the lower end of the pile. A cast-iron nozzle J or J' is nailed or spiked to the end of the piling over the end of the passage I'. Each of said nozzles is provided with a lip $j$, which extends at an angle to the securing-flange thereof and is adapted to rest against the inclined portion of the bottom, as shown in Fig. 22. Nozzle J is provided with a central aperture M and a side aperture M' opposite lip $j$, which is adapted to direct a jet into the groove of the adjacent pile which has been sunk. The nozzle J' has similar apertures $M^x$ and $M^2$ and in addition an annularly-arranged series of apertures $M^3$.

In sinking a pile by the method of washing away the dirt below it a high water-pressure must be employed, and therefore a practically water-tight connection with the passage I must be provided. This connection must be such that it will not protrude from the pile sufficiently to endanger its being sheared off as the pile is sunken, and it is also very desirable to use a hose to conduct the water thereto, as it is much more convenient than any other form of conductor. As it would greatly increase the expense if a new hose and coupling had to be supplied for each pile driven, a form of coupling which may be readily detached from the pile when the latter has been driven is therefore desirable.

A coupling which will fulfil the above requirement is shown in Figs. 8 to 15 and 22 and 23 and consists of a pair of grooved ways G G', which are firmly secured by bolts to the side of the pile on each side of the opening I. Sheet-packings N are placed between said ways and the surface of the piling and between each section, which inclose the passage I I', as shown in Fig. 23. An elbow-joint H, having a flange $h$, (shown in detail in Figs. 8 and 9,) is provided, and said ways are secured at a sufficient distance apart to permit flange $h$ to be placed between them. The thickness of flange $h$ is equal to the thickness of ways G G' inside the groove therein. A U-shaped key F is provided, which is adapted to fit in the grooves of said ways and when in this position clamps the flange $h$ firmly against the sheet-packing N on the side of the pile, making a substantially water-tight connection between said elbow and passage I I'.

In sinking the pile it is placed in position between the uprights of a pile-driver, and the weight of the latter is allowed to rest on the upper end thereof. The elbow H has a hose D connected thereto by the usual union coupling and is secured in the position shown in Figs. 22, 23 by the key F, said key being inverted when placed in position and having a wire cable E secured thereto midway of its bend. A small nail is preferably driven into the pile just above said key, so as to hold the latter in place. The water is then forced into the hose D and forcibly discharged through nozzle J, washing away the dirt, so that the pile may sink down easily and almost of its own weight. When it sticks, the pile-driver weight may be lifted a few inches, forcing the pile down. The side apertures M' or $M^2$ in the nozzle will keep the sand washed away from the groove in the section which has been previously driven, so that the section then being sunken will move into its proper position without obstruction and may form a water-tight joint with the next section. When the pile has been sunken to the desired depth, the cable E is attached to a fall-rope of the pile-driver, and the key F is drawn out of the coupling, so that the elbow H will be disconnected from the pile, permitting the hose and elbow to be drawn up or forced up by the reaction of the water discharged from the coupling. A second cable may be attached to the elbow or run through the hose to prevent the strain from being all thrown on the hose in case the elbow gets caught after it is disconnected. A nozzle and a pair of ways must of course be provided for each pile; but, as they are simply castings, their cost is a small item. By making the lower end of each section of hard wood the danger of its being split by the high water-pressure is greatly reduced.

In Fig. 24 I show the application of my coupling to a solid round pile, which is provided with a nozzle $J^2$ at its end and an inclined passage which connects said nozzle and the coupling. The lower end of said pile may be provided with hoops to prevent its splitting.

I am aware that prior to my invention water-jets have been used in sinking piles, and I therefore do not claim said invention broadly, but only the specified means for carrying out the method.

Having described my invention, what I claim as new, and desire to secure by Letters Patent of the United States, is as follows:

1. A sheet-piling which is composed of a series of planks connected together, a passage-way which is formed in the lower end of said piling which extends from the side through the middle to the lower end thereof, a nozzle on the lower end of said piling, and means for connecting a water-supply pipe to the upper end of said passage-way, for the purpose described.

2. The combination with a piling having a water-passage therein which extends from the side of the pile near its lower end to the middle of the lower end thereof, a pair of ways secured to the side of the pile on opposite sides of said passage, a flanged elbow which is adapted to be placed between said ways and be connected to said passage, a key which is adapted to connect said ways and the flange of said elbow, a hose connected to said elbow, and means for withdrawing said key so as to disconnect said elbow from the pile when it has been sunken to the desired depth.

3. A sheet-pile having a passage which extends from the side of the pile near its lower end to the middle of the lower end thereof, a pair of ways which are arranged on each side of the upper end of said passage, an elbow-joint having a flange which is adapted to be placed between said ways against the upper end of said passage, a U-shaped key which is adapted to engage said ways and hold said flange against the sides of the orifice of said passage, and a cord or cable connected to said key, said parts being arranged so that when the cable is pulled the key will be removed and the elbow disconnected from the pile.

4. A sheet-pile which is made up of three thicknesses of plank secured together, one of the outer thicknesses near the lower end of the pile being provided with an opening and an adjacent portion of the middle thickness being removed to the lower end of the pile, forming a passage-way therethrough, a nozzle which is secured to the end of said pile over the end of the passage, and means for connecting a water-pipe to said opening.

5. In combination with a pile having a passage-way in its lower end, a water-supply pipe, a detachable coupling which is adapted to connect said pipe to said passage-way, said coupling comprising a key which is adapted to hold the parts of said coupling in position, and means for withdrawing said key when the pile has been sunken.

6. A sheet-piling which is made up of a series of thicknesses of planks, one of the outside thicknesses being provided with an opening near the lower end of the pile and an inner thickness being provided with a passage which extends from said opening to the bottom of the pile, packings which are inserted between each thickness at the sides of said passage, and means for clamping the parts of pile together about said passage.

7. A sheet-pile having a tongue on one side and a groove on the other, a passage-way in the lower end thereof, a nozzle which is secured to the end of said pile over the end of said passage, said nozzle being provided with a central discharge-opening and a lateral opening on the side next the tongue of the pile, and means for forcibly discharging water into said passage-way, whereby the earth below the pile may be washed away and the groove in a previously-sunken section may be kept free from obstructions.

In testimony whereof I have affixed my signature in presence of two witnesses.

HIRAM A. MILLER.

Witnesses:
LOUIS H. HARRIMAN,
G. E. UCKER.